United States Patent
Herlocker (10) Patent No.: US 10,859,392 B2
(45) Date of Patent: Dec. 8, 2020

(54) DYNAMIC ONE-WAY STREET DETECTION AND ROUTING PENALTIES

(71) Applicant: Mapbox, Inc., San Francisco, CA (US)

(72) Inventor: Morgan Herlocker, Oakland, CA (US)

(73) Assignee: Mapbox, Inc., San Francisco, CA (US)

( * ) Notice: Subject to any disclaimer, the term of this patent is extended or adjusted under 35 U.S.C. 154(b) by 230 days.

(21) Appl. No.: 16/041,635

(22) Filed: Jul. 20, 2018

(65) Prior Publication Data

US 2020/0025583 A1    Jan. 23, 2020

(51) Int. Cl.
| | |
|---|---|
| G01C 21/34 | (2006.01) |
| G08G 1/015 | (2006.01) |
| G08G 1/065 | (2006.01) |
| G08G 1/01 | (2006.01) |

(52) U.S. Cl.
CPC ......... *G01C 21/3492* (2013.01); *G08G 1/015* (2013.01); *G08G 1/0129* (2013.01); *G08G 1/065* (2013.01)

(58) Field of Classification Search
CPC ............ G01C 21/3492; G01C 21/3461; G08G 1/015; G08G 1/065; G08G 1/0129
See application file for complete search history.

(56) References Cited

U.S. PATENT DOCUMENTS

| | | | | |
|---|---|---|---|---|
| 5,521,826 A | * | 5/1996 | Matsumoto ........ | G01C 21/3446 340/990 |
| 6,072,409 A | * | 6/2000 | Fushimi ................. | G01C 21/32 340/990 |
| 6,415,226 B1 | * | 7/2002 | Kozak ................ | G01C 21/3461 340/988 |
| 6,446,000 B2 | * | 9/2002 | Shimabara ......... | G01C 21/3658 701/428 |
| 6,505,117 B1 | * | 1/2003 | Ratert ................ | G01C 21/3446 701/455 |
| 8,694,241 B1 | * | 4/2014 | Kadous ................ | G08G 1/0112 701/118 |
| 9,367,814 B1 | | 6/2016 | Lewis et al. | |
| 10,156,848 B1 | * | 12/2018 | Konrardy ............... | G01C 21/34 |

(Continued)

OTHER PUBLICATIONS

Ho, Yao et al., "GPS Data Based Urban Guidance," IEEE, 2011, pp. 703-708.

(Continued)

*Primary Examiner* — Thomas Ingram
(74) *Attorney, Agent, or Firm* — Fenwick & West LLP (57) ABSTRACT

A method for avoiding likely one-way segments of roads in route planning is described. In selecting an optimal route, the cost of a possible route is computed by adding the costs associated with the segments along the route. Cost is a metric that is associated with the total expense to traverse a route in order to determine whether the route should be chosen over another. Each segment of a road is associated with a cost factor that represents the traffic condition of the segment. For a given segment, automobile traces that traveled the segment are counted. A ratio of traces traveled in one direction to traces traveled in the opposite direction is determined. If the ratio is below a certain threshold, the segment of the road is regarded as likely one-way. The original cost factor is replaced with a new cost factor that penalizes the segment in routing calculations.

20 Claims, 8 Drawing Sheets

(56) References Cited

U.S. PATENT DOCUMENTS

| | | |
|---|---|---|
| 2004/0049338 A1* | 3/2004 | Beesley ........... G08G 1/096811 |
| | | 701/423 |
| 2005/0165886 A1 | 7/2005 | Tuer et al. |
| 2006/0178140 A1 | 8/2006 | Smith et al. |
| 2011/0298603 A1 | 12/2011 | King et al. |
| 2014/0129141 A1* | 5/2014 | Nesbitt .............. G01C 21/3453 |
| | | 701/533 |
| 2014/0145862 A1 | 5/2014 | Wang et al. |
| 2014/0278052 A1 | 9/2014 | Slavin et al. |
| 2014/0279739 A1 | 9/2014 | Elkington et al. |
| 2015/0134233 A1 | 5/2015 | Wolf |
| 2015/0285656 A1 | 10/2015 | Verheyen et al. |
| 2016/0293001 A1* | 10/2016 | Xu ....................... G08G 1/0133 |
| 2017/0039765 A1 | 2/2017 | Zhou et al. |
| 2019/0050624 A1 | 2/2019 | Chai et al. |

OTHER PUBLICATIONS

Simoncini, M. et al., "Vehicle Classification from Low Frequency GPS Data," IEEE, 2016, pp. 1159-1166.

Sinha, A. et al., "Kinect based people identification system using fusion of clustering and classification," IEEE, 2014, 9 pages.

Zhu, W. et al., "Applying semi-supervised learning method for cellphone-based travel mode classification," IEEE, 2015, 7 pages.

* cited by examiner

DYNAMIC ONE-WAY STREET DETECTION AND ROUTING PENALTIES

BACKGROUND

This disclosure relates to digital maps. More specifically, this disclosure relates to detecting likely one-way streets based on reported telemetry data.

Digitally stored electronic maps are used to provide directions to users of mobile devices, for example, using any of a wide array of standalone map or direction application programs. Electronic maps also typically include other functionality, such as providing turn-by-turn directions to nearly any location. When a mobile device is using an electronic map, the location of the mobile device can be determined using Wi-Fi or the Global Positioning System (GPS), which reports a device location using latitude and longitude, and optionally height and time as well. This location data, as well as other data, may be collected by the electronic map provider and may be termed "telemetry" data for the mobile device. Other information, such as speed, heading, acceleration, and deceleration may be calculated using the GPS data. Individually, or in combination, the telemetry data may be used for many different applications.

Drivers are increasingly reliant on routing features of digital map applications to navigate through different locations. Routing calculations are often based on electronic map data in the digital maps that are obtained through surveys of local areas. To ensure the accuracy of the digital maps, electronic map data are updated with caution in relatively slow and deliberate processes. As a result, electronic map data often are unable to capture latest or temporary changes in road conditions such as road constructions and temporary detours. A change in road condition may alter the road from two-way to one-way, or vice versa. Relying on map data, a map application may direct users to go the wrong way on a one-way street.

SUMMARY

This disclosure relates to identifying likely one-way segments of roads and adjusting traffic profile data associated with those identified segments to avoid a routing application from selecting a route that uses a wrong direction of a one-way road. A routing application often relies on different types of data to perform routing calculations, including electronic map, telemetry data, and travel profile data. Electronic map data describe territories, coordinates, and geometries of objects (e.g. roads, buildings, etc.) in an area. Electronic map data usually have slow update cycles and rely on local-area surveys to ensure the accuracy of the data. As such, it is often challenging to capture recent or temporary changes of road conditions in the electronic map data without compromising the accuracy of the data. Telemetry data include time and location information reported from different mobile devices. Traffic profile data describe or predict the dynamic or real-time situations of roads. Traffic profile data may include estimated speeds of roads, which are often derived based on telemetry data as well as map data such as surveyed speed limits of roads. To predict whether a segment of a road is one-way, telemetry data relating to vehicles that traveled the segment are collected to observe whether the vast majority of vehicles only traveled in a single direction. If the segment is determined to be likely one-way, the traffic profile data associated with the segment (e.g., the estimated speed of the segment stored in the traffic profile data) is overwritten or supplemented to indicate that the segment is likely one-way. By adjusting the traffic profile data, the integrity of the electronic map data is not affected.

In accordance with an embodiment, the adjustment made in response to a likely one-way road determination is directed to data used in routing calculations so that the routing application avoids routing vehicles to a likely wrong direction, even though the map data may still indicate the road is two-way. A routing application may use a least-cost routing technique to select an optimal route for a destination. A cost is a metric that is associated with the total expense to traverse a route in order to determine whether the route should be chosen over another. For example, time is one type of cost that may be used in routing calculations. Distance may be another type of cost. A route is broken down into segments of roads and intersections. Each segment is associated with a cost factor. For example, a time cost factor is associated with an estimated speed of the segment. Time for traversing a segment of a road may be determined by the distance of segment divided by the estimated speed of the segment. The total cost of the route is based on the sum of the costs associated with different segments of roads having different cost factors. A route with the lowest cost to traverse is selected as the optimal route. The adjustment to a likely one-way segment may be made to penalize the cost factor so that routes that include the segment in the likely wrong direction will be associated with high costs and, thus, will not be selected when other lower-cost routes are available.

More specifically, in accordance with an embodiment, the determination of a likely one-way segment and the adjustment of routing cost factors are performed based on telemetry data. A routing server receives telemetry data of traces associated with an area. A trace is associated with a mobile computing device that transmits telemetry data such as location and time information to a server. For a given segment of a road, the server may match and align the trace data with an electronic map and identify traces that are associated with the segment. The number of traces that traveled the segment is then counted. When there is a sufficient number of sample traces for the segment, the server computes a percentage of traces that traveled the road in one direction relative to the total number of traces that traveled the segment. For example, in one case, the percentage is computed by the absolute value of the difference between the number of traces traveled in a first direction and that traveled in the opposite direction divided by the total number of traces. If the percentage is above a threshold (e.g., 90%), this indicates that an overwhelmingly large portion of vehicles is traveling in one direction. In response, the server may regard the segment as likely one-way and one of the directions as likely a wrong direction. In turn, the server may impose a penalty on the likely wrong direction associated with routing calculations by overwriting or supplementing the original cost factor that may be stored as part of the traffic profile data with a penalized cost factor. The penalized cost factor may significantly increase the calculated cost associated with the segment in the likely wrong direction so that any routes that include such segment in the likely wrong direction will have high costs. As such, a routing application will instead select a route that avoids the segment having the penalized cost based on the least-cost routing approach, if such route is available.

Embodiments described herein increase the overall accuracy of routing computations and promote user satisfaction with routing instructions without compensating a more vigorous process in updating a digital map.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF EXAMPLE EMBODIMENTS

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention. Other embodiments, aspects and features will become apparent from the disclosure as a whole.

Example Computer System Implementation

Figure 1:
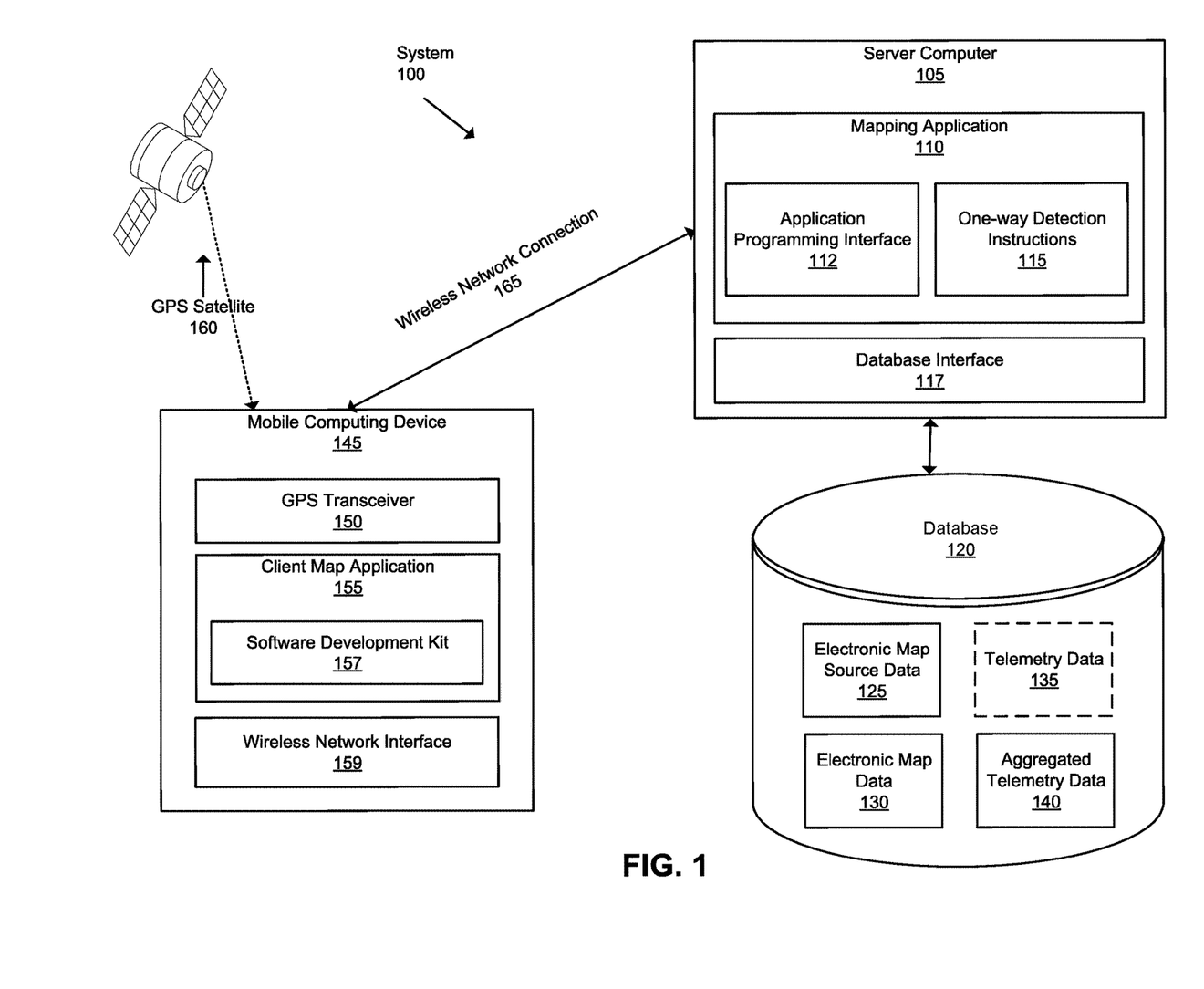
FIG. 1 illustrates an example computer system in which the techniques described may be practiced, according to one embodiment.

FIG. 1 illustrates an example computer system in which the techniques described may be practiced, according to one embodiment.

In an embodiment, a computer system 100 comprises components that are implemented at least partially by hardware at one or more computing devices, such as one or more hardware processors executing stored program instructions stored in one or more memories for performing the functions that are described herein. In other words, all functions described herein are intended to indicate operations that are performed using programming in a special-purpose computer or general-purpose computer, in various embodiments. FIG. 1 illustrates only one of many possible arrangements of components configured to execute the programming described herein. Other arrangements may include fewer or different components, and the division of work between the components may vary depending on the arrangement.

FIG. 1 illustrates a mobile computing device 145 that is coupled via a wireless network connection 165 to a server computer 105, which is coupled to a database 120. A GPS satellite is coupled via a wireless connection to the mobile computing device 145. The server computer 105 comprises a mapping application 110, an application programming interface (API) 112, one-way detection instructions 115 and a database interface 117. The database 120 comprises electronic map source data 125, electronic map data 130, telemetry data 135, and aggregated telemetry data 140. The mobile computing device 145 comprises a GPS transceiver 150, client map application 155, software development kit (SDK) 157 and wireless network interface 159.

Server computer 105 may be any computing device, including but not limited to: servers, racks, workstations, personal computers, general purpose computers, laptops, Internet appliances, wireless devices, wired devices, multi-processor systems, mini-computers, and the like. Although FIG. 1 shows a single element, the server computer 105 broadly represents one or multiple server computers, such as a server cluster, and the server computer may be located in one or more physical locations. Server computer 105 also may represent one or more virtual computing instances that execute using one or more computers in a data center such as a virtual server farm.

Server computer 105 is communicatively connected to database 120 and mobile computing device 145 through any kind of computer network using any combination of wired and wireless communication, including, but not limited to: a Local Area Network (LAN), a Wide Area Network (WAN), one or more internetworks such as the public Internet, or a company network. Server computer 105 may host or execute mapping application 110 and may include other applications, software, and other executable instructions, such as database interface 117, to facilitate various aspects of embodiments described herein.

In one embodiment, a database interface 117 is a programmatic interface such as JDBC or ODBC for communicating with database 120. The database interface 117 may communicate with any number of databases and any type of database, in any format. Database interface 117 may be a piece of custom software created by an entity associated with mapping application 110, or may be created by a third party entity in part or in whole.

In one embodiment, database 120 is a data storage subsystem consisting of programs and data that is stored on any suitable storage device such as one or more hard disk drives, memories, or any other electronic digital data recording device configured to store data. Although database 120 is depicted as a single device in FIG. 1, database 120 may span multiple devices located in one or more physical locations. For example, database 120 may include one or nodes located at one or more data warehouses. Additionally, in one embodiment, database 120 may be located on the same device or devices as server computer 105. Alternatively, database 120 may be located on a separate device or devices from server computer 105.

Database 120 may be in any format, such as a relational database, a noSQL database, or any other format. Database 120 is communicatively connected with server computer 105 through any kind of computer network using any combination of wired and wireless communication of the type previously described. Optionally, database 120 may be communicatively connected with other components, either directly or indirectly, such as one or more third-party data suppliers. Generally, database 120 stores data related to electronic maps including, but not limited to: electronic map source data 125, electronic map data 130, telemetry data 135, and aggregated telemetry data 140. These datasets may be stored as columnar data in a relational database or as flat files.

In one embodiment, electronic map source data 125 are raw digital map data that are obtained, downloaded or received from a variety of sources. The raw digital map data may include satellite images, digital street data, building or place data or terrain data. Example sources include National Aeronautics and Space Administration (NASA), United States Geological Survey (USGS), and DigitalGlobe. Electronic map source data 125 may be updated at any suitable interval and may be stored for any amount of time. Once obtained or received, electronic map source data 125 are used to generate electronic map data 130.

In one embodiment, electronic map data 130 are digital map data that are provided, either directly or indirectly, to client map applications, such as client map application 155, using an API. Electronic map data 130 are based on electronic map source data 125. Specifically, electronic map source data 125 may be processed and organized as a plurality of vector tiles which may be subject to style data to impose different display styles. Electronic map data 130 may be updated at any suitable interval and may include additional information beyond that derived from electronic map source data 125. For example, various additional information may be stored in the vector tiles, such as traffic patterns, turn restrictions, detours, common or popular routes, speed limits, new streets, and any other information related to electronic maps or the use of electronic maps.

In one embodiment, telemetry data 135 are digital data that are obtained or received from mobile computing devices 145 via function calls that are included in a Software Development Kit (SDK) that application developers use to integrate and include electronic maps in applications. In one embodiment, telemetry data 135 are anonymous sensor data that are corrected from various users of the map applications 155 that are installed in the mobile computing devices 145 based on users' voluntary reporting. The telemetry data 135 may include various anonymous map-related data collected by the mobile computing devices 145. As indicated by the dotted lines, telemetry data 135 may be transiently stored, and are processed as discussed below before storage as aggregated telemetry data 140.

More specifically, the telemetry data 135 include time observations and location information based on GPS signals. In one embodiment, the time and location of telemetry data 135 associated with a single mobile computing device 145 is referred to as a trace. Telemetry data 135 may additionally include one or more digitally stored events, in which each event comprises a plurality of event attribute values. Telemetry events may include session start, map load, map pan, map zoom, map tilt or rotate, location report, speed and heading report, or a visit event including dwell time plus location. Telemetry event attributes may include latitude-longitude values for the then-current position of the mobile device, a session identifier, instance identifier, application identifier, device data, connectivity data, view data, and timestamp.

In one embodiment, aggregated telemetry data 140 are telemetry data 135 that have been processed using anonymization, chunking, filtering, or a combination thereof. Anonymization may include removing any data that identifies a specific mobile device or person. Chunking may include segmenting a continuous set of related telemetry data into different segments or chunks representing portions of travel along a route. For example, telemetry data may be collected during a drive from John's house to John's office. Chunking may break that continuous set of telemetry data into multiple chunks so that, rather than consisting of one continuous trace, John's trip may be from John's house to point A, a separate trip from point A to point B, and another separate trip from point B to John's office. Chunking may also remove or obscure start points, endpoints, or otherwise break telemetry data into any size. Filtering may remove inconsistent or irregular data, delete traces or trips that lack sufficient data points, or exclude any type or portion of data for any reason. Once processed, aggregated telemetry data 140 may be stored in association with one or more tiles related to electronic map data 130. Aggregated telemetry data 140 may be stored for any amount of time, such as a day, a week, or more. Aggregated telemetry data 140 may be further processed or used by various applications or functions as needed.

In one embodiment, mobile computing device 145 is any mobile computing devices, such as a laptop computer, hand-held computer, wearable computer, cellular or mobile phone, portable digital assistant (PDAs, or tablet computer. Although a single mobile computing device is depicted in FIG. 1, any number of mobile computing devices may be present. Each mobile computing device 145 is communicatively connected to server computer 105 through wireless network connection 165 which comprises any combination of a LAN, a WAN, one or more internetworks such as the public Internet, a cellular network, or a company network.

Mobile computing device 145 is communicatively coupled to GPS satellite 160 using GPS transceiver 150. GPS transceiver 150 is a transceiver used by mobile computing device 145 to receive signals from GPS satellite 160, which broadly represents three or more satellites from which the mobile computing device may receive signals for resolution into a latitude-longitude position via triangulation calculations.

Mobile computing device 145 also includes wireless network interface 159 which is used by the mobile computing device to communicate wirelessly with other devices. In particular, wireless network interface 159 is used to establish wireless network connection 165 to server computer 105. Wireless network interface 159 may use Wi-Fi, WiMAX, Bluetooth, ZigBee, cellular standards or others.

Mobile computing device 145 also includes other hardware elements, such as one or more input devices, memory, processors, and the like, which are not depicted in FIG. 1. Mobile computing device 145 also includes applications, software, and other executable instructions to facilitate various aspects of embodiments described herein. These applications, software, and other executable instructions may be installed by a user, owner, manufacturer, or other entity related to the mobile computing device. In one embodiment, mobile computing device 145 includes client map application 155 which is software that displays, uses, supports, or otherwise provides electronic mapping functionality as part of the application or software. Client map application 155 may be any type of application, such as a taxi service, a video game, a chat client, a food delivery application, etc. In an embodiment, client map application 155 obtains electronic mapping functions through SDK 157, which may implement functional calls, callbacks, methods or other programmatic means for contacting the server computer to obtain digital map tiles, layer data, or other data that can form the basis of visually rendering a map as part of the application. In general, SDK 157 is a software development kit that allows developers to implement electronic mapping without having to design all of the components from scratch. For example, SDK 157 may be downloaded from the Internet by developers, and subsequently incorporated into an application which is later used by individual users.

In server computer 105, the mapping application 110 provides the API 112 that may be accessed, for example, by client map application 155 using SDK 157 to provide electronic mapping to client map application 155. Specifically, mapping application 110 comprises program instructions that are programmed or configured to perform a variety of backend functions needed for electronic mapping including, but not limited to: sending electronic map data to mobile computing devices, receiving telemetry data 135 from mobile computing devices, processing telemetry data to generate aggregated telemetry data 140, receiving electronic map source data 125 from data providers, processing electronic map source data 125 to generate electronic map data 130, and any other aspects of embodiments described herein. Mapping application 110 includes one-way detection instructions 115, which are programmed or configured to detect whether roads or segments of roads are likely one-way. In an embodiment, the mapping application 110 may also reside in the mobile computing device 145.

According to one embodiment, the techniques described herein are implemented by one or more computing devices. For example, the server computer 105 and mobile computing device 145 may be computer devices configured as special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and program logic to implement the techniques.

Hardware Implementation

Figure 2:
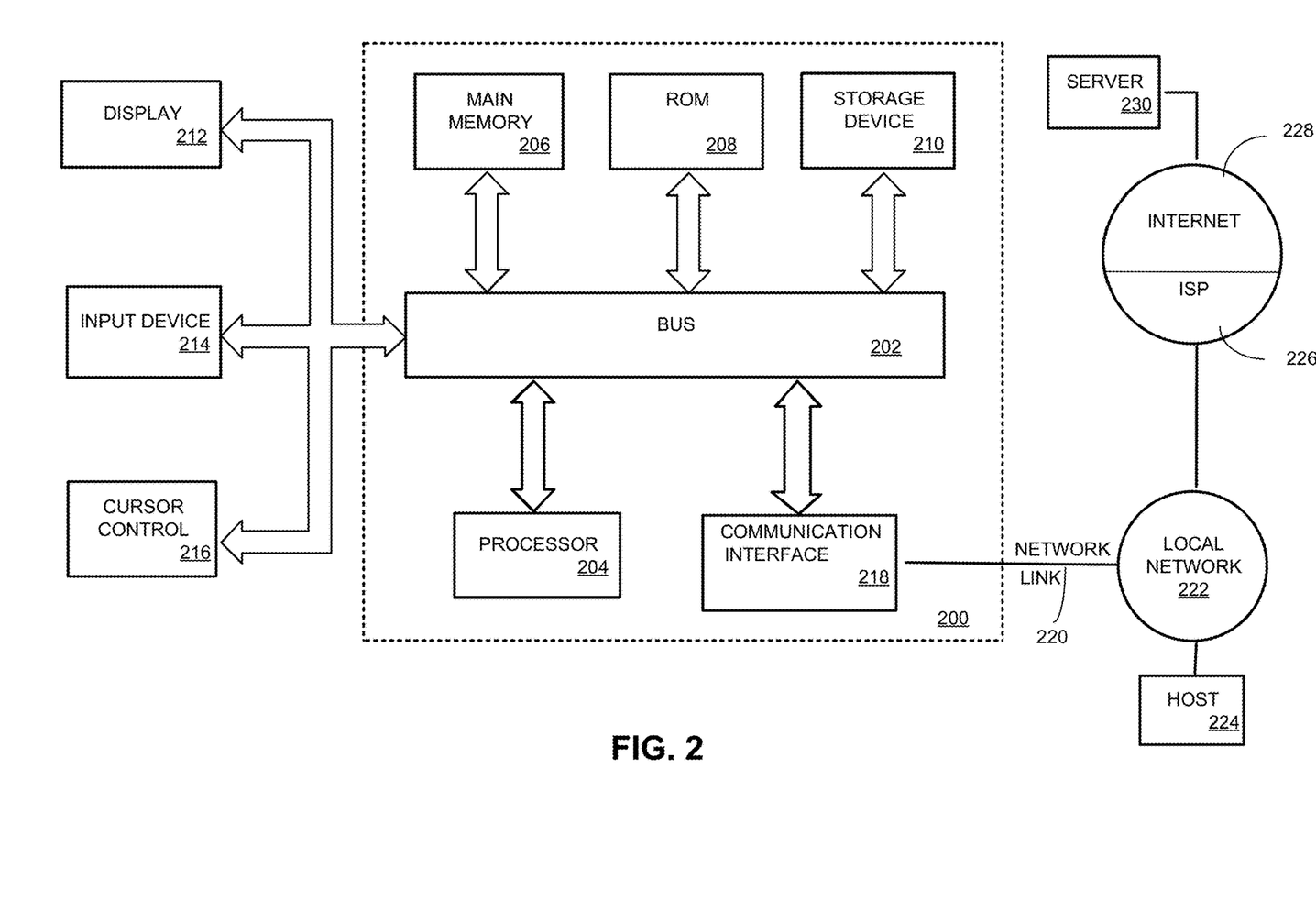
FIG. 2 illustrates a computer system upon which an embodiment may be implemented.

FIG. 2 is a block diagram that illustrates a computer system 200 upon which an embodiment of the invention may be implemented. Computer system 200 includes a bus 202 or another communication mechanism for communicating information, and a hardware processor 204 coupled with bus 202 for processing information. Hardware processor 204 may be, for example, a general purpose microprocessor.

Computer system 200 also includes a main memory 206, such as a random access memory (RAM) or another dynamic storage device, coupled to bus 202 for storing information and instructions to be executed by processor 204. Main memory 206 also may be used for storing temporary variables or other intermediate information during execution of instructions to be executed by processor 204. Such instructions, when stored in non-transitory storage media accessible to processor 204, render computer system 200 into a special-purpose machine that is customized to perform the operations specified in the instructions.

Computer system 200 further includes a read-only memory (ROM) 208 or other static storage device coupled to bus 202 for storing static information and instructions for processor 204. A storage device 210, such as a magnetic disk or optical disk, is provided and coupled to bus 202 for storing information and instructions.

Computer system 200 may be coupled via bus 202 to a display 212, such as an LCD screen, LED screen, or touch screen, for displaying information to a computer user. An input device 214, which may include alphanumeric and other keys, buttons, a mouse, a touchscreen, or other input elements is coupled to bus 202 for communicating information and command selections to processor 204. In some embodiments, the computer system 200 may also include a cursor control 216, such as a mouse, a trackball, or cursor direction keys for communicating direction information and command selections to processor 204 and for controlling cursor movement on display 212. The cursor control 216 typically has two degrees of freedom in two axes, a first axis (e.g., x) and a second axis (e.g., y), that allows the device to specify positions in a plane.

Computer system 200 may implement the techniques described herein using customized hard-wired logic, one or more ASICs or FPGAs, firmware and program logic which in combination with the computer system causes or programs computer system 200 to be a special-purpose machine. According to one embodiment, the techniques herein are performed by computer system 200 in response to processor 204 executing one or more sequences of one or more instructions contained in main memory 206. Such instructions may be read into main memory 206 from another storage medium, such as storage device 210. Execution of the sequences of instructions contained in main memory 206 causes processor 204 to perform the process steps described herein. In alternative embodiments, hard-wired circuitry may be used in place of or in combination with software instructions.

The term "storage media" as used herein refers to any non-transitory media that store data and instructions that cause a machine to operation in a specific fashion. Such storage media may comprise non-volatile media and volatile media. Non-volatile media includes, for example, optical or magnetic disks, such as storage device 210. Volatile media includes dynamic memory, such as main memory 206. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge. In one embodiment, a memory (e.g., main memory 206 and ROM 208) in the computer system 200 may include a non-transitory computer readable storage medium configured to store program code. The program code includes instructions that, when executed by a processor, cause the processor to perform various methods and processes described herein.

Storage media is distinct from but may be used in conjunction with transmission media. Transmission media participates in transferring information between storage media. For example, transmission media includes coaxial cables, copper wire and fiber optics, including the wires that comprise bus 202. Transmission media can also take the form of acoustic, radio, or light waves, such as those generated during radio-wave and infra-red data communications, such as WI-FI, 3G, 4G, BLUETOOTH, or wireless communications following any other wireless networking standard.

Various forms of media may be involved in carrying one or more sequences of one or more instructions to processor 204 for execution. For example, the instructions may initially be carried on a magnetic disk or solid state drive of a remote computer. The remote computer can load the instructions into its dynamic memory and send the instructions over a telephone line using a modem. A modem local to computer system 200 can receive the data on the telephone line and use an infra-red transmitter to convert the data to an infra-red signal. An infra-red detector can receive the data carried in the infra-red signal and appropriate circuitry can place the data on bus 202. Bus 202 carries the data to main memory 206, from which processor 204 retrieves and executes the instructions. The instructions received by main memory 206 may optionally be stored on storage device 210 either before or after execution by processor 204.

Computer system 200 also includes a communication interface 218 coupled to bus 202. Communication interface 218 provides a two-way data communication coupling to a network link 220 that is connected to a local network 222. For example, communication interface 218 may be an integrated services digital network (ISDN) card, cable modem, satellite modem, or a modem to provide a data communication connection to a corresponding type of telephone line. As another example, communication interface 218 may be a local area network (LAN) card to provide a data communication connection to a compatible LAN. Wireless links may also be implemented. In any such implementation, communication interface 218 sends and receives electrical, electromagnetic or optical signals that carry digital data streams representing various types of information.

Network link 220 typically provides data communication through one or more networks to other data devices. For example, network link 220 may provide a connection through local network 222 to a host computer 224 or to data equipment operated by an Internet Service Provider (ISP) 226. ISP 226, in turn, provides data communication services through the world wide packet data communication network now commonly referred to as the "Internet" 228. Local network 222 and Internet 228 both use electrical, electromagnetic or optical signals that carry digital data streams. The signals through the various networks and the signals on network link 220 and through communication interface 218, which carry the digital data to and from computer system 200, are example forms of transmission media.

Computer system 200 can send messages and receive data, including program code, through the network(s), network link 220 and communication interface 218. In the Internet example, a server 230 might transmit a requested code for an application program through Internet 228, ISP 226, local network 222 and communication interface 218. The received code may be executed by processor 204 as it is received and be stored in storage device 210, or other non-volatile storage for later execution.

Map and Routing Application

Figure 3:
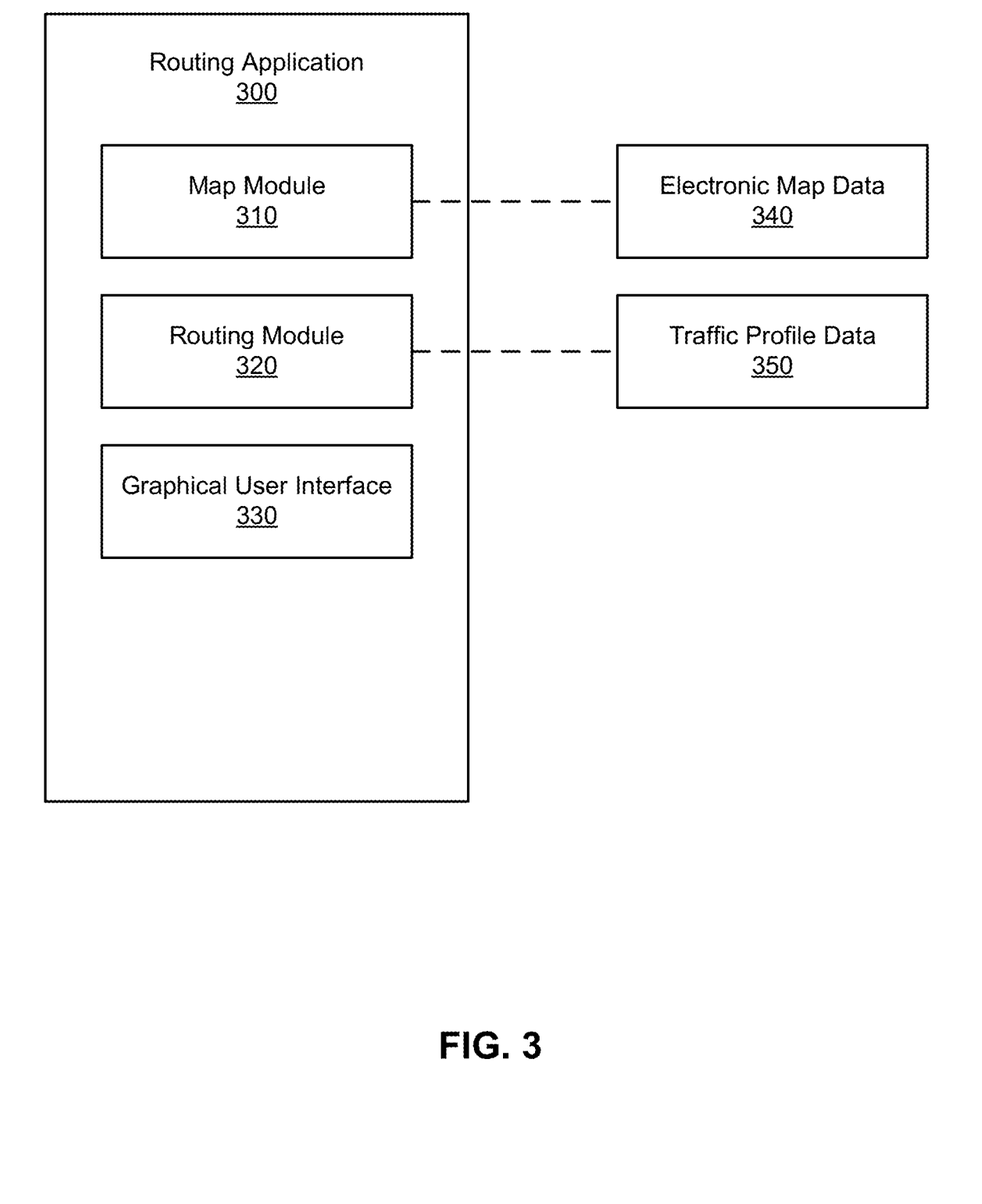
FIG. 3 is a block diagram illustrating a routing application, in accordance with an embodiment.

FIG. 3 is a block diagram illustrating a routing application 300, in accordance with an embodiment. The routing application 300 may be a client map application 155 shown in FIG. 1, the mapping application 110 shown in FIG. 1, or may be another application operable in a computing device without visually displaying a map. The routing application 300 may include a map module 310, a routing module 320, and a graphical user interface 330 that cooperate to provide maps and routing information to users of the routing application 300. In one case, the routing application may provide audio, visual or text routing instructions only without displaying a map in the graphical user interface 330. Different and/or additional components may be included in the routing application 300, but those components are not shown in FIG. 3.

The map module 310 provides maps for display in the graphical user interface 330 of the routing application 300. Images of maps can be generated in the graphical user interface 330 based on users' selection of locations and users' preferences on the graphical elements of the maps. The map module 310 may rely on electronic map data 340 to generate map images. The electronic map data 340 may reside on or outside the routing application 300. For example, the electronic map data 340 may be electronic map data 130 resided in a remote database and part of the map data are transmitted to the routing application 300 on demand via network communication. The map data source that provides the electronic map data 340 may be a proprietary data source or an open map data source.

Electronic map data are data that describe the territories, locations, coordinates, geometries, sizes, contours, elevations of objects (e.g., roads, buildings, etc.) and metadata that label the objects in the map and provide additional information to the map. The electronic map data 340 may be arranged in the form of tiles. Tiles are building blocks of an electronic map. Electronic maps can be displayed at different zoom levels. A tile may be associated with a particular zoom level. When the zoom level of the map changes, different tiles are used to reconstruct the map. For example, when a user chooses to zoom an electronic map from a less zoomed level to a more zoomed level, tiles corresponding to larger areas are replaced by tiles corresponding to smaller areas to reconstruct a more zoomed map. Tiles may take the form of image tiles or vector tiles.

In one embodiment, the electronic map data 340 are arranged in the form of vector tiles. Vectors are collections of mathematical values and directions that define geometries, road outlines, and other properties of an electronic map. Each tile may include multiple vectors that define the objects (e.g. roads, buildings, etc.) in the geographical location associated with the tile. The vector tiles can be used to render a map of a location based on specifications of visual styles. Specifications of visual styles may be criteria that are stored outside of the electronic map data 340 and that allow maps based on same underlying electronic map data 340 to be presented in different styles. Styles are sets of rules that define the visual appearance of an electronic map when the map is rendered. A style can include information about data sources, style layers, sprites, glyphs, metadata, etc. A specification of visual styles may also define different graphical elements, which may include labels, lines, textures, colors, fonts, etc. Different specifications of visual styles may be used to generate different renderings of a map. For example, a dark, nighttime style can use the same vector tiles as a light, daytime style for visualization.

In one embodiment, when a user specifies a location and a zoom level at the routing application 300, the map module 310 requests and receives electronic map data 340 that includes one or more vector tiles. The map module 310, based on one or more specifications of visual styles, then renders a map for display in the graphical user interface 330. The specification of visual styles may be determined by user preference in the routing application 300 and/or by selection of the developer of the routing application 300. When the user selects a different location and/or a different zoom level, different sets of vector tiles are transmitted to the map module 310 to construct different maps for display in the graphical user interface 330.

The routing module 320 is configured to receive routing queries from users and, in response, provide routing instructions in the graphical user interface 330. Different routing instructions may be provided for different forms of transportation including driving, biking, and walking. Routing instructions may be generated using a routing algorithm based on traffic profile data 350.

The traffic profile data 350 are data that represent the traffic conditions of roads and may include estimated speed data of the roads. The estimated speed data may be generated based on different sources of data. In one embodiment, the estimated speed data may be generated based on real-time speed data, historical time-dependent speed data, historical average speed, and default speed data such as surveyed speed limits and/or road-type speeds. Real-time and historical speed data may be derived from the aggregated telemetry data 140 while default speeds may be derived from the electronic map data 340. For how different types of speed data may be aggregated to derive the estimated speed data for a particular segment of a road, U.S. patent application Ser. No. 15/693,193, entitled "Generating Accurate Speed Estimations using Aggregated Telemetry data," filed on Aug. 31, 2017, is hereby incorporated by reference in its entirety for all purposes.

The routing algorithm that is used to generate routing instructions may be any suitable routing algorithm. The routing algorithm may reside in the routing application 300 and/or a remote server that communicates with the routing module 320. For example, in one embodiment the routing module 320 in a mobile computing device includes the routing algorithm and is capable of performing route calculations at the mobile computing device based on the traffic profile data 350 retrieved from a database. In another embodiment, the routing algorithm may reside in a remote server computer and the routing module 320 access to an API of the server computer that performs the routing calculations in order to obtain the routing instructions.

The electronic map data 340 and the traffic profile data 350 usually have different update frequencies. The electronic map data 340 include data that represent relatively more stable or lasting objects in a map such as roads, buildings, etc. The updates of the electronic map data 340 are often based on various surveys of different locations that update the coordinates and/or conditions of the objects in the areas. Such updates are often performed in a slower pace and a more deliberate process, and a given object may not be updated for weeks, months, or longer. On the contrary, the traffic profile data 350 include data that represent the dynamic conditions of the roads. Hence, the generation of the traffic profile data 350 are often performed frequently. Some data in the traffic profile data 350 are generated daily. Other data in the traffic profile data 350 are generated hourly, per minute, or even faster.

Routing Calculations

Figure 4:
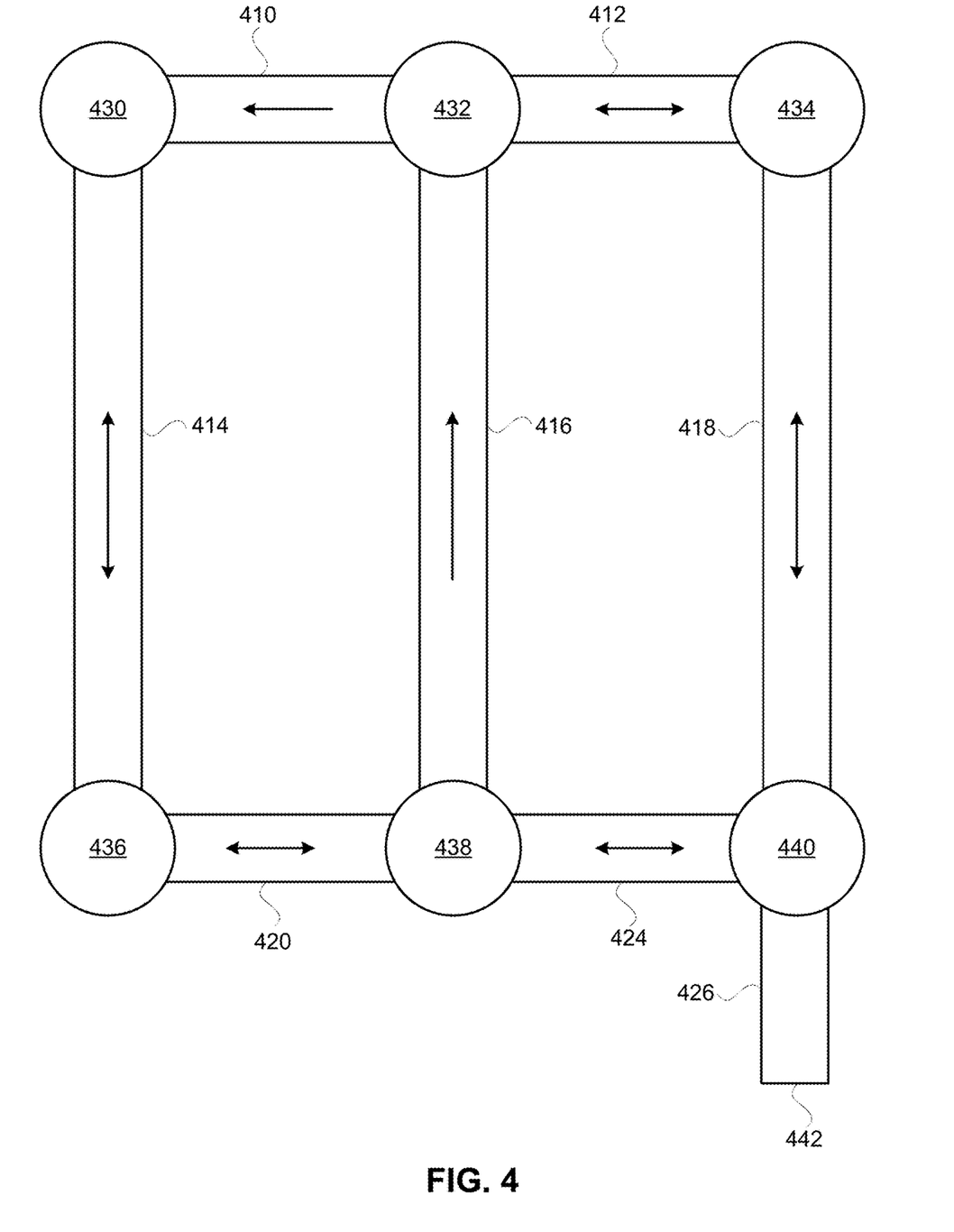
FIG. 4 is a block diagram illustrating a normalized road network, in accordance with an embodiment.

FIG. 4 is a block diagram illustrating a normalized road network 400 that may be used as a basis for routing calculations, in accordance with an embodiment. A normalized road network of an area is a standardized road representation that splits roads into different segments so that each segment may be treated individually in a routing calculation. The normalized road network 400 is one form of an electronic map that is constructed using the electronic map data 340. In the normalized road network 400, road segments are referred to as edges 410-426 and intersections where roads meet are referred to as nodes 430-440 (represented by circles in FIG. 4). A road segment is split into two edges when a node is present in the middle of a road. For example, the top road in FIG. 4 is split by node 432 into two edges 410 and 412. "Road," in this context, refers to any mapped path in the electronic map data 340. Therefore, a road can be a highway, a local street, a private road, part of a parking lot such as a lane between parked cars, and even an alley. Some edges, such as the edge 426, may lead to dead ends, such as a dead end 442. Different directions (e.g., eastbound versus westbound) may also be treated as two edges. Using a normalized road network can simplify the map and increase the computational speed of routing calculations.

The normalized road network 400 may include additional data that label the edges and nodes. In one embodiment, the additional data include metadata that identify whether an edge is one-way or two-way. For example, most of the edges in the normalized road network 400 are labeled as two-way except that the edge 410 is labeled as westbound only and the edge 416 is labeled as northbound only. The metadata that label the normalized road network 400 are obtained from the electronic map data 340 that are changed less frequently compared to the traffic profile data 350. The one-way or two-way metadata as part of the electronic map data 340 may be obtained from surveys of the area. Since the normalized road network 400 is constructed using the electronic map data 340, the labels of one-way or two-way of a particular segment of a road may not always reflect the actual condition of the road. For example, a two-way segment may be temporarily changed to one-way due to road construction. A one-way segment may have recently been expanded to two-way, but no survey has been conducted yet in the area to update the data in the electronic map data 340. In some situations, the labels of one-way or two-way of a segment may also be errors in the electronic map data 340.

Figure 5:
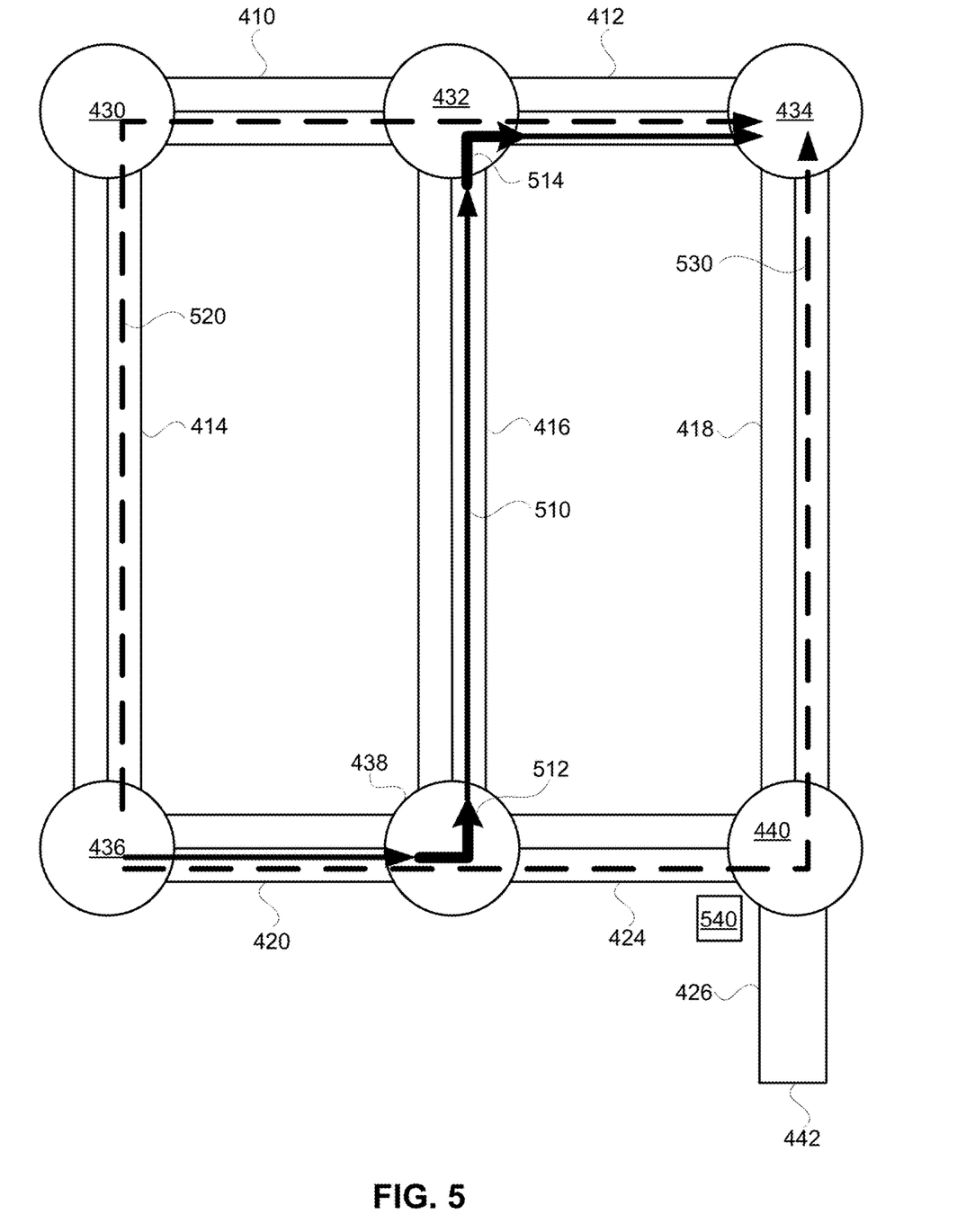
FIG. 5 is a block diagram illustrating a route planning performed by a routing application, in accordance with an embodiment.

FIG. 5 is a block diagram illustrating a route planning performed by a routing algorithm, in accordance with an embodiment. The routing algorithm may utilize a least-cost routing technique to calculate costs associated with different potential routes from a starting point to a destination and determine the optimal route that has the lowest cost. In FIG. 5, the node 436 (lower left corner) is shown as the starting point and the node 434 (top right corner) is shown as the destination. In route planning, cost is a metric that is associated with the total expense to traverse a route in order to determine whether the route should be chosen over another. A common type of cost used in map routing calculations is the time needed for the route, although other cost types such as the amount of delay, length of the route, and reliability factor of the route may also be used as costs in a routing calculation.

A cost calculation of a route determines a combination of costs associated with road segments (e.g. edges in a normalized road network) along the route and costs associated with maneuvers required at intersections (e.g. nodes in a normalized road network) along the route. With respect to the costs associated with edges along the route, the calculation is based on traffic profile data 350. For example, the traffic profile data 350 may include an estimated speed of a particular segment of the road at a given time that may be used to calculate the cost of the segment of the road. Alternatively or additionally, other factors such as congestion levels may also be taken into considerations.

Based on different traffic profile data 350, a cost factor is determined for a particular segment of the road. A cost factor of a particular segment of the road is a quantity that determines the calculation of cost associated with the segment. The cost factor is associated with an estimated speed of the segment of the road. For example, if time is used as the cost, the estimated speed of the segment can be used directly as a cost factor in the calculation. In such case, the cost (time) is computed by the length of the segment divided by the cost factor (estimated speed). Computing using another type of cost and cost factor is also possible. Other forms of alternative cost factors may also be used. Those alternative cost factors may be variations of the estimated speed, such as a delay factor, or may be other types of cost factors such as a length factor, etc.

Each segment is associated with a different cost factor (e.g., a different estimated speed). The total cost computation is illustrated using an exemplary route 510 (shown collectively by several joined solid-line arrows that have different line weights in FIG. 5), which travels from the node 436 to the node 434 via the edge 420, the node 438, the edge 416, the node 432, and the edge 412. The edge 420, the edge 416 and the edge 412 are respectively associated with different cost factors that are determined based on traffic profile data 350. A cost of an edge may be determined by the distance of the edge scaled by the cost factor of the edge. For example, when the cost factor is the projected speed of the edge, then the cost of the edge is the time that is required to traverse the edge based on the length of the edge and the projected speed.

In addition to the aggregated cost of all edges along the route, the total cost of a route, in some embodiments, may also include costs that are associated with maneuvers required at nodes along the route. Maneuvers are actions required for a vehicle in order to complete the route. Example maneuvers may include right turn, left turn, U-turn, passing a traffic light, stopping at a stop sign, merging, off-ramp, on-ramp, roundabout, etc. Different maneuvers are associated with different cost. For example, in a right-hand traffic country such as the United States, making a left turn usually takes longer than making a right turn. Hence, a higher cost may be associated with the maneuver of making a left turn than making a right turn. For the route 510, a first maneuver (e.g. a left turn 512) is required to be made at the node 438 and a second maneuver (e.g. a right turn 514) is required to be made at the node 432. In one embodiment, such maneuvers are included in the total cost of the route. Hence, the cost of route 510 from the node 436 to the node 434 may be the total of the cost at edge 420, the maneuver (left turn 512) at node 438, the cost at edge 416, the maneuver (right turn 514) at node 432, and the cost at edge 412.

The determination of lowest cost route from a starting point to the destination includes cost calculations of different edges and different nodes. Different routing techniques such as contraction hierarchies, Dijkstra algorithm, A* search algorithm, etc. may be employed to improve the computation efficiency in finding the lowest cost route. A routing application may identify several possible routes, such as routes 510, 520, and 530, and compare the total cost of each route to determine the optimal route.

One-Way Prediction

Figure 6:
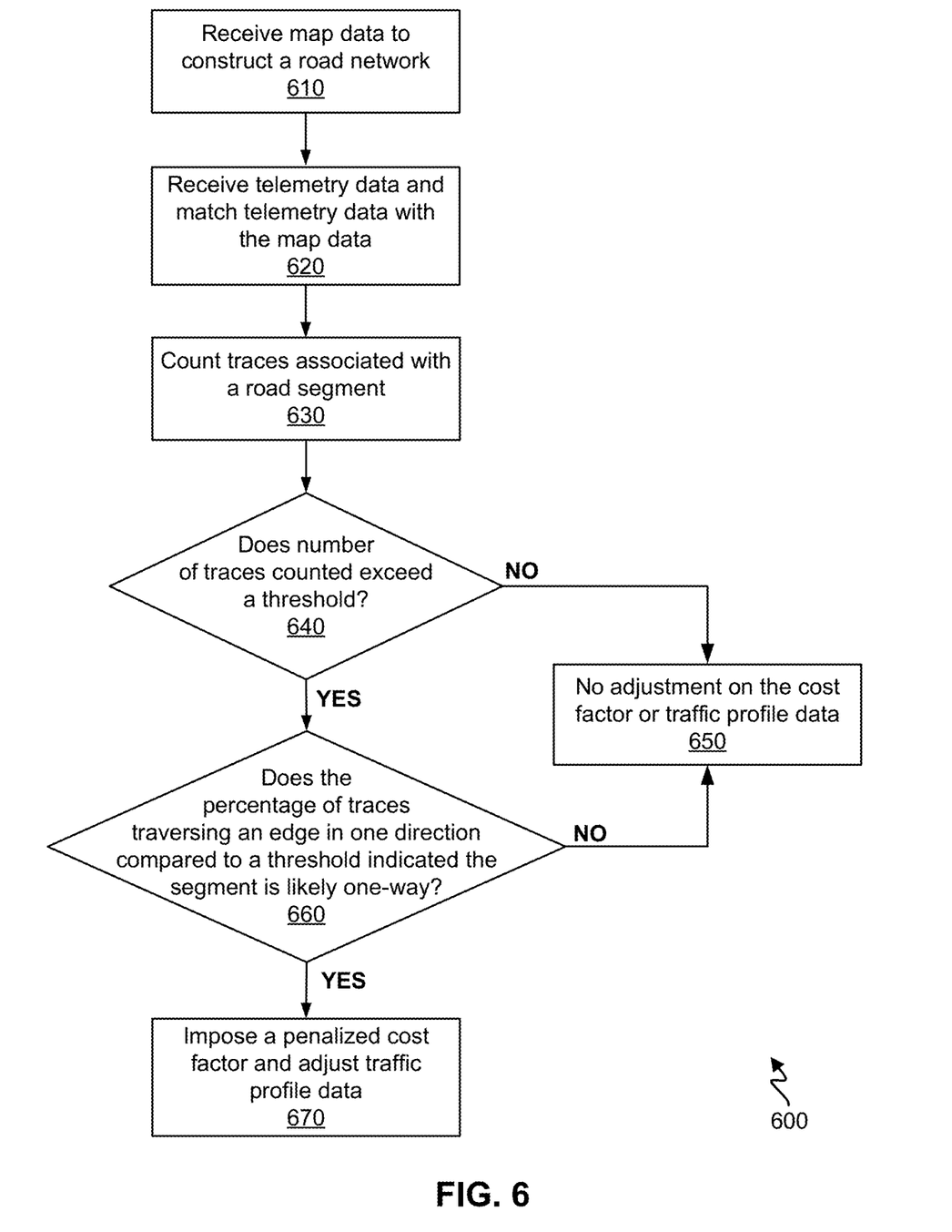
FIG. 6 is a flowchart depicting a process of determining whether a segment of a road is one-way, in accordance with an embodiment.

FIG. 6 is a flowchart depicting a process 600 of determining whether a segment of a road (referred to as an edge here) is likely one-way in order to decrease the likelihood of routing vehicles to the edge in a wrong direction, in accordance with an embodiment. The process 600 may be carried out by a computer system that determines, based telemetry data of an edge, whether the edge is likely one-way or not. The computer system may be a server that controls and operates a map and routing system. If the edge is determined to be likely one-way, the cost factor associated with the edge in the direction opposite the likely one-way direction (i.e. the likely wrong direction) is adjusted to or supplemented with a penalized cost factor. A penalized cost factor is an imposed cost factor that will increase the cost of traversing the edge in a routing calculation. In one embodiment, the penalized cost factor is imposed without regard to the actual traffic profile data of the edge. In another embodiment, the penalized cost factor may proportionally adjust the original cost factor based on the traffic profile data. By increasing the cost associated with traversing the edge, the penalized cost factor reduces the chance of a map application selecting a route that includes traversing the likely one-way edge in the opposite direction. In some cases when the penalty imposed is severe enough, the chance of selecting such a route is practically zero.

The process 600 may start with a server receiving 610 map data 340 (e.g. vector tiles) from an electronic map data source for an area of a location. The server may process the map data to form a normalized road network of the area. The formation of road network may include normalizing the roads by identifying intersections (nodes) in the area and splitting road into edges based on the nodes. The server may also receive additional metadata of electronic map data. The metadata may include labeling information of the roads in the area. For example, the metadata may include information regarding whether an edge is one-way or two-way based on survey data.

The server receives 620 telemetry data such as aggregated telemetry data 140. The server then matches the telemetry data to the road network constructed from the electronic map data. The telemetry data includes data associated with a collection of multiple traces. Here, a trace is associated with a mobile computing device that transmits telemetry data such as location and time information of the mobile computing device to a server. For telemetry data that is associated with driving, a trace is associated with an automobile vehicle. The matching of telemetry data with the road network is a process that associates and aligns different traces to different edges based on the location information of the traces. In some cases, telemetry data of different types of traces (e.g. associated with different forms of transportation) may be collected. Hence, the server may first filter to remove biking and walking telemetry data (e.g., traces associated with bicycles or pedestrians). The server then tries to assign the traces to different segments based on the location and direction of the traces so that vehicles on a segment of a road is correctly associated with the edge representing the segment.

For how a server may filter biking and walking telemetry data, U.S. patent application Ser. No. 15/673,160, entitled "Detection of Travel Mode Associated with Computing Devices," filed on Aug. 9, 2017, is hereby incorporated by reference in its entirety for all purposes.

For a given edge, a trace stream is created to count 630 the number of traces associated with an edge. For example, the number of traces traveling on a particular edge is counted over a period of time such as a day or several hours. The number of traces may be proportional to the number of vehicles traveling on the segment of the road within certain statistical confidence.

The server determines 640 whether the number of traces counted for a particular edge exceeds a minimum observation threshold. This minimum observation threshold may be referred to as a traversal frequency. Such determination is employed to ensure there are sufficient numbers of sample vehicles that traveled the edge before one-way street likelihood determination is performed. In one case, the threshold can be 500, 1000, or another suitable number. In response to the number of traces counted being less than the threshold traversal frequency, the server does not perform 650 any adjustment on the cost factor associated with the edge because there are insufficient data samples for the server to make a determination whether the edge is likely one-way or not. In such case, the routing calculations may rely on the metadata from the electronic map data 340 that is based on surveys of the area and the unaltered traffic profile data to perform the routing calculations. For example, the electronic map data 340 may specify an edge to be two-way and there is an insufficient number of traces associated with the edge. In response, the routing calculation will continue to assume the edge is two-way and continue to calculate the cost of routes that include the edge based on the traffic profile data.

In response to the number of counted traces being more than the threshold traversal frequency, the process 600 continues to another decision stage. The server determines 660 a percentage of traces traversing an edge in a first direction of the two directions of the edge relative to the total number of traces traveled in the edge. In one case, the percentage is computed as the absolute value of the difference between the number of traces traveled in a first direction and the number of traces traveled in a second direction opposite the first direction divided by the total number of traces traversing the edge. The percentage is compared to a one-way trigger threshold. For example, the one-way trigger threshold may be 90%. When the percentage of traces that represents the difference between the number of traces in two directions is higher than the threshold, the edge is determined as likely one-way because samples indicate 90% or more vehicles traveled only in the one direction opposite another. The vehicles traveling in the likely wrong direction may result from drivers' mistake in traveling in the wrong way, data errors, or other reasons. In another case, the one-way trigger threshold may be 75%.

In response to the percentage of traces traversing an edge in a direction being lower than the one-way trigger threshold, the server regards the edge as likely one-way. The server then imposes 670 a penalty on the edge by overwriting (or supplementing) the original cost factor obtained from traffic profile data 350 with a penalized cost factor. The penalized cost factor will result in a cost increase associated with the edge in the penalized direction so that a route that is originally associated with a low cost (e.g., low enough to be selected) using the original cost factor is now a high-cost route and is unlikely to be selected. Using an estimated speed of an edge as an example of a cost factor, the originally estimated speed associated with a direction of the edge may be 30 miles per hour in accordance with the traffic profile data. When the one-way determination is triggered and the direction is penalized, a penalized cost factor is imposed and the estimated speed of the edge in that direction may be set to a very low number, e.g. 1 mile per hour. Hence, any potential routes that include the edge in the penalized direction will be associated with significantly higher costs. As such, the chance of selecting those routes are dramatically decreased. In one embodiment, the penalized cost factor sets the estimated speed of the edge in the penalized direction to zero or substantially zero (e.g., in a range from 0 to 0.5 inclusively). As such, a routing application practically does not select any routes that include the penalized way. The penalized cost factor may be imposed on a predetermined period of time or until a new prediction based on a new or updated set of telemetry data indicates that the edge is no longer predicted to be one-way. In some cases, each round of prediction may occur in a predetermined frequency, such as daily or more or less frequently.

The imposition of a penalized cost factor may take the form of adjusting traffic profile data 350 stored in a database. For example, the traffic profile data 350 stored in the database 120 may include an estimated speed of an edge. When a likely one-way edge is detected, the estimated speed of the likely wrong direction may be adjusted to a very low number or zero until another round of prediction indicates that the edge is no longer predicted to be likely one-way. When the one-way determination is no longer triggered, the cost factor and the traffic profile data 350 will no longer be adjusted. In other words, the cost factor and the traffic profile data 350 will revert to the original profile.

In some situations, despite imposing an unfavorable cost to an edge in a direction, the penalized cost factor may be outweighed by other factors. For example, in FIG. 5, the edge 426 may represent the only edge to reach the dead end 442. Even if the edge 426 is detected as one-way, the penalized cost factor can be outweighed by other factors so that the edge 426 continues to serve as a part of the recommended route for routing queries that involve the dead end 442. The outweigh factors can be other conditions or data that alter the routing calculation. For instance, if the edge with the penalized direction is the only way to get to the destination, a route including such edge with such direction may still be selected. Road sign and labels of electronic map electronic map data 340 may also be examples of outweighing factors. For example, in FIG. 5, a road sign of "Dead End" stored in the map electronic map data 340 may label the node 440 with the road sign 540. The presence of such road sign may outweigh the penalized cost factor for routing calculations that involve the dead end 442 as a destination.

Since the one-way detection process described here relies on dynamic traffic information, the detection process may be performed and re-evaluated frequently based on new telemetry data. This allows the routing process to react quickly to changing conditions of a road. A conventional one-way determination that is based on map data derived from surveys often fails to capture temporary road conditions such as road construction and temporary detours. Because some of the one-way determinations result from temporary road conditions, in one embodiment, the adjustment of data is made only to the traffic profile data 350 that are generated frequently. In one embodiment, the adjustment of data is not made to electronic map data 340 so that any temporary changes to the road does not actually affect the map. As a result, routing calculations are improved without risking errors in the map data.

The traversal frequency threshold, the one-way trigger threshold, and the penalized cost factor may be adjusted and optimized based on confidence and risk tolerance. For example, the higher the one-way trigger threshold, the fewer two-way edges will be falsely predicted as one-way (false positive cases), but fewer actual one-way edges will be identified. On the other hand, increasing the traversal frequency threshold will decrease the number of edges taken into the one-way consideration. As such, adjusting one or both thresholds may improve the confidence level that a detected one-way edge is in fact a one-way edge. In one embodiment, the penalized cost factor may be determined based on the confidence level. For example, if the confidence level that the edge is in fact one-way is high, the estimated speed (i.e. one example of cost factor) of the edge in the penalized direction can be set to zero. On the contrary, if the confidence level is low, the estimated speed of the edge in the penalized direction may be reduced but not set to zero to allow other factors to potentially outweigh the penalized cost factor.

In one embodiment, a regression analysis may be performed to determine the optimal traversal frequency threshold and the optimal one-way trigger threshold so that the two thresholds can cooperate to identify a high number of actual one-way edges and a low number of false positive cases. In performing the regression, an area of an actual location may be used and the one-way/two-way information in electronic map data may be assumed to be true. A regression analysis may then be performed to minimize the error in failing to identify one-way edges and the error in falsely identifying two-way edges as one-way. In one embodiment, the false positive error is weighed significantly (e.g. 10 times) more heavily than the errors in missing one-way edges.

Turn and Other Maneuver Restriction

Figure 7:
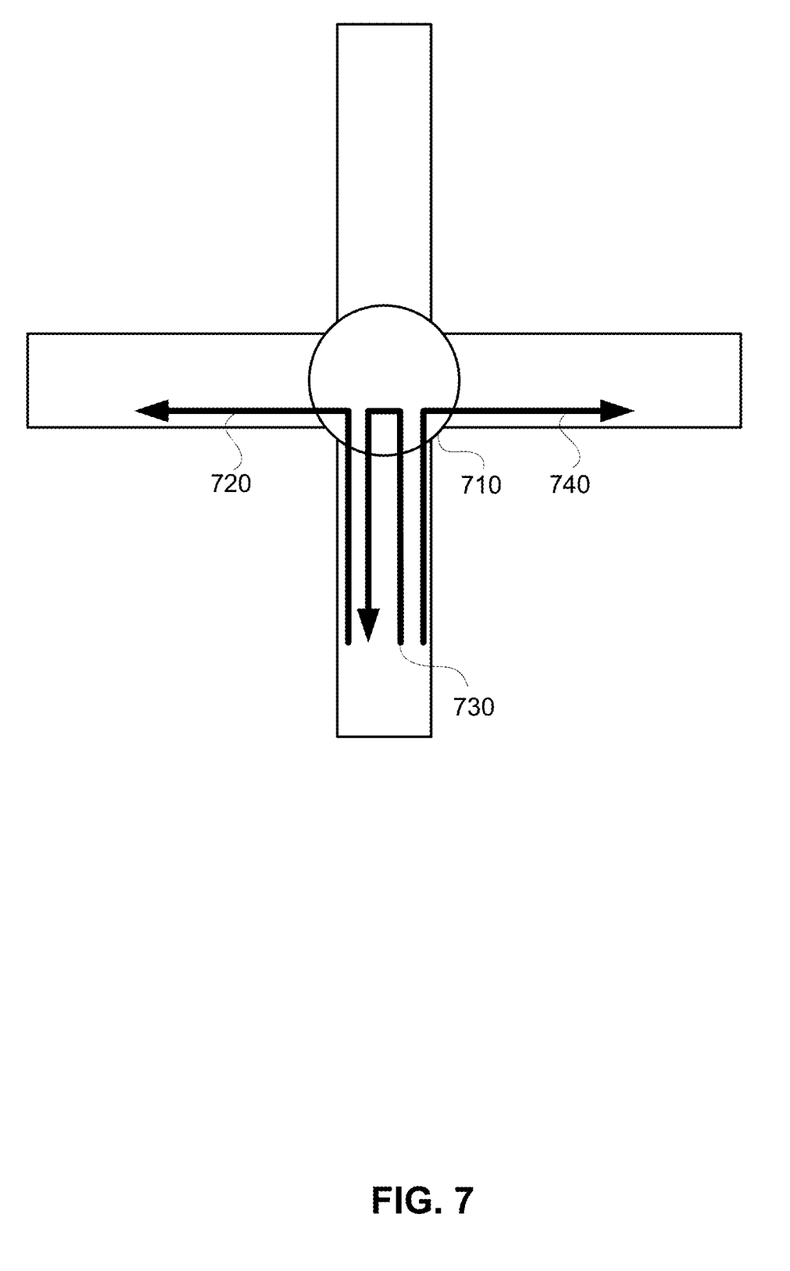
FIG. 7 is a block diagram illustrating a detection of turn restriction, in accordance with an embodiment.

In addition to one-way road detection, the imposition of cost penalty in routing calculations may also be applied to detected turn restrictions. FIG. 7 is a block diagram of a node illustrating detection of a possible turn restriction, in accordance with an embodiment. At some road intersections, only certain maneuvers are allowed while other maneuvers are prohibited. For example, in right-hand drive countries such as the United States, left turns are prohibited in some busy roads. Similar to detecting whether an edge is one-way, traces from traffic profile data 350 at a node 710 are counted. If the total counts of the traces exceed a minimum observation threshold, the percentage of each maneuver (e.g., a left turn 720, a U-turn 730, and a right turn 740) relative to all maneuvers (including going straight) is determined. In response to a percentage of a maneuver being lower than a maneuver-restriction trigger threshold, the node 710 is determined to be associated with a maneuver restriction. For example, if less than 1% of the traces traveling at the node 710 made a left turn 720, it may indicate that the node 710 prohibits left turn. In response, the cost factor of making such maneuver is adjusted to a penalized cost factor to increase the cost of any route that includes making such maneuver at the node 710. As such, routes that involve such penalized maneuver will be avoided unless other factors outweigh the penalty. In one embodiment, the threshold may be determined based on the statistical expected value of a maneuver at common intersections. For example, for common intersections that allow left turns, a statistical analysis may indicate that the expected value of vehicles that would make left turns is 10% of all vehicles traveled at those intersections. A threshold may be determined based on the expected value.

Routing Calculation Process

Figure 8:
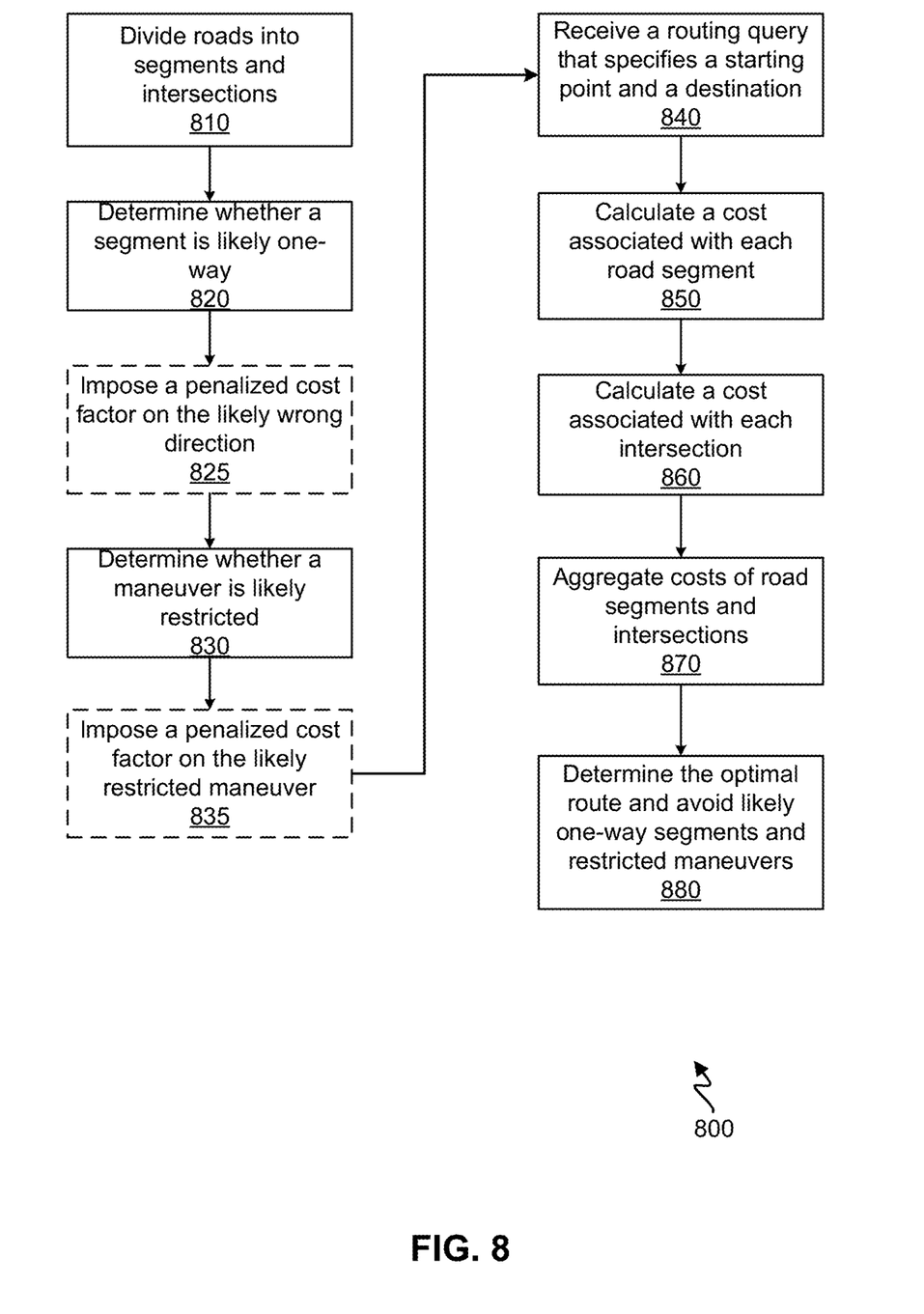
FIG. 8 is a flowchart depicting a process of routing calculation, in accordance with an embodiment.

FIG. 8 is a flowchart depicting a process 800 of a routing calculation operable by a map system, in accordance with an embodiment. The map system receives map data and divides 810 roads into segments and intersections that are associated with different maneuvers to be carried out at the intersection. For each segment, the map system determines 820 whether the segment is likely one-way. Responsive to the determination that the segment is likely one-way, the map system imposes 825 a penalized cost factor on the likely wrong direction. The penalized cost factor is higher than the original cost factor. However, if the segment is not determined as likely one-way, the map system skips 825, as indicated by the dashed line. For each intersection, the map system determines 830 whether a maneuver is likely restricted at the intersection. Responsive to the determination that the maneuver is likely restricted, the map system imposes 835 a penalized cost factor on the likely restricted maneuver. However, if the maneuver is not determined as likely restricted, the map system skips 835, as indicated by the dashed line. The process of 820-835 is repeated for different segments and intersection of the map. The determination of one-way roads and restricted maneuver may be performed at a certain frequency, such as daily.

The map system may receive 810 a routing query from a user that specifies a starting point and a destination. Such queries may be received by the map system frequently, such as many times per second. The map system uses the original cost factors and any imposed penalized cost factors that may be associated with some segments and intersections to perform least-cost routing computations. In response to a routing query, the map system calculates 850 a cost associated with each road segment along possible routes from the starting point to the destination. The calculation may be based on original cost factors and/or some imposed penalized cost factors. The map system also calculates 860 a cost associated with each intersection along possible routes. The map system aggregates 870 costs of road segments and intersections to determine the total cost of possible routes. The map system determines 880 the optimal route by selecting the route that is associated with the lowest cost. The map system may select a route that avoids any likely one-way segment (e.g., a segment that has penalized cost) or any likely restricted maneuver at certain intersections.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
    accessing an electronic map associated with a segment of a road, the electronic map including data describing a geographic location of the road;
    identifying, based on telemetry data, a plurality of traces of automobile vehicles that traveled a direction of the segment of the road;
    determining a percentage of traces that traveled in the direction relative to a total number of the plurality of traces;
    overwriting a cost factor of routing calculation associated with the segment with a penalized cost factor based on the percentage of traces, the penalized cost factor increasing a cost associated with traversing the segment of the road and being stored in traffic profile data, the traffic profile data describing one or more traffic conditions of the road;
    receiving a routing query;
    computing a penalized cost associated with the segment using the penalized cost factor, the penalized cost being higher than an original cost computed using the cost factor; and
    selecting a route that avoids the segment having the penalized cost.

2. The method of claim 1, wherein the cost factor is a first estimated speed of the segment and the penalized cost factor is a second estimated speed that is lower than the first estimated speed.

3. The method of claim 2, wherein the second estimated speed is substantially zero.

4. The method of claim 1, wherein overwriting of the cost factor with the penalized cost factor does not change the map data.

5. The method of claim 1, further comprising:
determining the total number of the plurality of traces exceeds a threshold traversal frequency before the cost factor is overwritten to the penalized cost factor.

6. The method of claim 1, wherein identifying the plurality of traces of automobile vehicles comprises filtering traces that are associated with bicycles or pedestrians.

7. The method of claim 1, the selecting of the route comprises adding a maneuver cost associated with a maneuver to be carried out along the route.

8. The method of claim 7, wherein the maneuver cost is increased in response to a prediction of a likely maneuver restriction associated with the maneuver.

9. The method of claim 8, wherein the prediction of the likely maneuver restriction comprises:
identifying a second plurality of traces of automobile vehicles traveled at an intersection;
determining a second percentage of traces performing the maneuver at the intersection relative to a total number of the second plurality of traces; and
responsive to the second percentage being lower than a second threshold, classifying the intersection as having the likely maneuver restriction.

10. A non-transitory computer readable storage medium configured to store program code, the program code comprising instructions that, when executed by one or more processors, cause the one or more processors to:
access an electronic map associated with a segment of a road, the electronic map stores data that describes a geographic location of the road;
identify, based on telemetry data, a plurality of traces of automobile vehicles that traveled a direction of the segment of the road;
determine a percentage of traces that traveled in the direction relative to a total number of the plurality of traces;
overwrite a cost factor of routing calculation associated with the segment with a penalized cost factor based on the percentage of traces, the penalized cost factor increases a cost associated with traversing the segment of the road and is stored in traffic profile data, the traffic profile data describes one or more traffic conditions of the road;
receive a routing query;
compute a penalized cost associated with the segment using the penalized cost factor, the penalized cost being higher than an original cost computed using the cost factor; and
select a route that avoids the segment having the penalized cost.

11. The non-transitory computer readable storage medium of claim 10, wherein the cost factor is a first estimated speed of the segment and the penalized cost factor is a second estimated speed that is lower than the first estimated speed.

12. The non-transitory computer readable storage medium of claim 11, wherein the second estimated speed is substantially zero.

13. The non-transitory computer readable storage medium of claim 10, wherein overwriting of the cost factor of the segment with the penalized cost factor does not change the map data.

14. The non-transitory computer readable storage medium of claim 10, wherein the instructions further cause the one or more processors to:
determine the total number of the plurality of traces exceeds a threshold traversal frequency before the cost factor is overwritten to the penalized cost factor.

15. The non-transitory computer readable storage medium of claim 10, wherein the identifying of the plurality of traces of automobile vehicles comprises filtering traces that are associated with bicycles or pedestrians.

16. The non-transitory computer readable storage medium of claim 10, wherein the selection of the route comprises adding a maneuver cost associated with a maneuver to be carried out along the route.

17. A method comprising:
accessing an electronic map associated with an intersection of a road, the electronic map including data describing a geographic location of the road;
accessing a cost factor associated with a maneuver at the intersection that is stored in traffic profile data, the traffic profile data describing one or more traffic conditions of the road, wherein the cost factor is used in routing calculations to compute a cost of performing the maneuver at the intersection in order to determine whether a route including the maneuver at the intersection is selected among a plurality of possible routes;
identifying, based on telemetry data, a plurality of traces of automobile vehicles that traveled at the intersection;
determining a percentage of traces of automobile vehicles that performed the maneuver relative to a total number of the plurality of traces; and
overwriting the cost factor associated with the maneuver with a penalized cost factor, the penalized cost factor increasing a cost that results in a higher cost associated with performing the maneuver in the routing calculations.

18. The method of claim 17, wherein the maneuver is selected from a group consisting of right turn, left turn, U-turn, passing a traffic light, stopping at a stop sign, merging, off-ramp, on-ramp, roundabout.

19. The method of claim 17, wherein a total cost of a route in the routing calculation is a sum of costs of traversing segments along the route and costs of performing maneuvers at intersections along the route.

20. The method of claim 17, further comprising:
accessing a second cost factor associated with a segment of the road;
determining a second percentage of traces that traveled the segment of the road in a direction; and
overwriting the second cost factor with a second penalized cost factor based on the second percentage of traces.

* * * * *